United States Patent
Mori et al.

[11] Patent Number: 5,971,376
[45] Date of Patent: Oct. 26, 1999

[54] LIQUID-ENCLOSING TYPE VIBRATION ISOLATING DEVICE

[75] Inventors: Yoshiyuki Mori, Aichi; Yukio Takashima; Toshiya Tsujimoto, both of Osaka, all of Japan

[73] Assignee: Toyo Tire & Rubber Co., Ltd., Osaka, Japan

[21] Appl. No.: 09/034,071

[22] Filed: Mar. 3, 1998

[30] Foreign Application Priority Data

Mar. 14, 1997 [JP] Japan ..................................... 9-060984

[51] Int. Cl.$^6$ ........................................................ F16F 9/00
[52] U.S. Cl. ...................................... 267/140.13; 267/219
[58] Field of Search .............................. 267/140.13, 219, 267/35, 220, 140.11, 140.14; 180/300, 312, 902; 248/636, 562, 634, 635, 638

[56] References Cited

U.S. PATENT DOCUMENTS

| | | |
|---|---|---|
| 4,632,372 | 12/1986 | Nakajima et al. . |
| 4,842,258 | 6/1989 | Misaka et al. ....................... 267/140.13 |
| 5,088,700 | 2/1992 | Kanda et al. ........................ 267/140.13 |
| 5,183,243 | 2/1993 | Matsumoto .......................... 267/140.13 |
| 5,240,233 | 8/1993 | Kato et al. .............................. 267/219 |
| 5,295,671 | 3/1994 | Nakagaki et al. .................. 267/140.13 |
| 5,316,275 | 5/1994 | Maeno et al. . |
| 5,560,592 | 10/1996 | Shimoda et al. .................... 267/140.13 |
| 5,645,138 | 7/1997 | Tajima et al. ....................... 267/140.11 |

FOREIGN PATENT DOCUMENTS

0763672A2  3/1997  European Pat. Off. .

*Primary Examiner*—Doulas C. Butler
*Attorney, Agent, or Firm*—Jordan and Hamburg LLP

[57] ABSTRACT

The present invention provides a liquid-enclosing type vibration isolating device of all around stopper type with a reliable stopper action at a time of a large displacement of a main body metal fitting in the device, in a liquid-enclosing type vibration isolating device in which a main body metal fitting and a mounting metal fitting disposed thereunder are connected to each other through a vibration isolating body formed with a rubber elastic member with a liquid being sealed therewithin, the lower mounting metal fitting comprises a boss metal fitting integrally formed with a mounting bolt and inserted into the vibration isolating body, a spacer metal fitting having a flange portion for a stopper at the upper portion and fitted into the boss metal fitting, and a mounting plate metal fitting fixed to the boss metal fitting so as to hold the spacer metal fitting in a fixed state, a required clearance is provided between the flange portion of the spacer metal fitting and the plate metal fitting, and a lower end portion of a stabilizer continuously provided to the main body metal fitting is inwardly bent so as to be positional within the clearance, thereby achieving a stopper action.

4 Claims, 3 Drawing Sheets

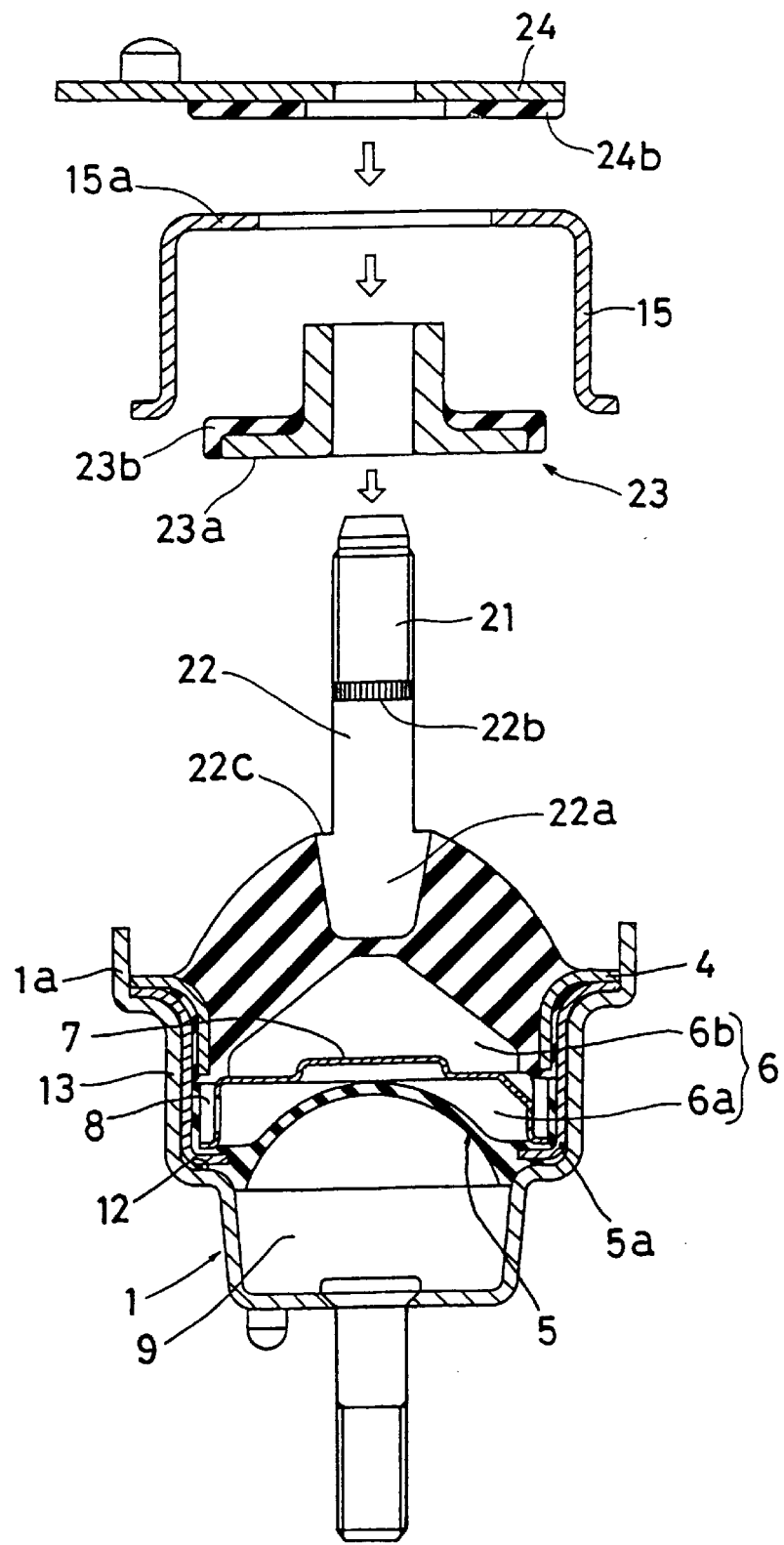

LIQUID-ENCLOSING TYPE VIBRATION ISOLATING DEVICE

BACKGROUND OF THE INVENTION

1. Field of the Invention

The present invention relates to a liquid-enclosing type vibration isolating device used for isolating a vibration in supporting a vibration generating body such as a power unit mainly as an automotive engine and the like.

2. Description of the Related Art

A liquid-enclosing type vibration isolating device has been known as a mount for supporting a vibration generating body such as an automotive engine in such a manner as not to transmit a vibration thereof to a vehicle body. In the liquid-enclosing type vibration isolating device, a cylindrical main body metal fitting and a mounting metal fitting respectively fastened to a vibration generating body and a support are connected to each other through a vibration isolating body consisting of a block-like rubber elastic body within the main body metal fitting, a diaphragm consisting of a rubber film is disposed in such a manner as to face the vibration isolating body so that an internal chamber is formed as a liquid-enclosed chamber. The liquid-enclosed chamber is divided into two chambers by a partition so that both chambers are communicated with each other through an orifice. Accordingly, a vibration-damping performance and a vibration-insulation performance can be achieved by a liquid flowing effect between both the chambers due to the orifice and a vibration isolating effect of the vibration isolating body.

In this kind of vibration isolating device, a stopper mechanism is provided for restricting a large vertical displacement of the main body metal fitting which is due to a deformation of the vibration isolating body caused by the vibration.

In the conventional structure employed for the stopper mechanism, a member such as a stabilizer is mounted on the mounting metal fitting and a stopper mechanism in the vertical direction is constituted by a part of said member such as a stabilizer and a projecting portion in a part of the vibration isolating body. This structure has no sufficient support strength as a stopper, so that there has been a risk that the stopper deviates from its operationable position at a time of the large displacement of the main body metal fitting. Accordingly, particularly in recent years, there has been suggested a liquid-enclosing type vibration isolating device of "all around (whole circumference) stopper type", in which the mounting metal fitting is provided with a stopper flange projecting in a radial direction, while a cylindrical stopper metal fitting (i.e., a stabilizer) is fixed to the main body metal fitting with an end portion of the stopper metal fitting being inwardly bent and extended, thereby forming a stopper portion having a contact surface on whole circumference (for example, Japanese Utility Model Application No. 7-189131(1995)).

Here, in the all around stopper type with the cylindrical stopper metal fitting described above, heat is accumulated in the inner portion of the stopper metal fitting to increase an ambient temperature of the vibration isolating body. As a result, there is such a problem in durability of the device that the increased temperature promotes deterioration of a rubber as a material of the vibration isolating body.

Accordingly, it is required for the vibration isolating body made of a rubber elastic member to be placed farthest possible from the engine as a heat source and to avoid interference with the other parts, so that there has been considered as means for meeting the requirement that the mounting metal fitting to which the stopper rubber is attached is set to be at the side of the support such as the chassis.

In this vibration-isolating device, it is required that the mounting metal fitting is able to be securely and stably mounted on the support side. Further, in a mounting operation, it is also required that coming off of the mounting metal fitting and the members constituting the all around or whole circumferential stopper provided in the mounting metal fitting, or the like, is able to be prevented, thereby ensuring good assembling operability and mounting operability and, further, maintaining good performance.

SUMMARY OF THE INVENTION

It is therefore an object of the present invention to solve the above problem in a liquid-enclosing type vibration isolating device of an all around stopper type.

In accordance with the invention, there is provided a liquid-enclosing type vibration isolating device in which a main body metal fitting opened downward and a mounting metal fitting disposed thereunder are connected to each other through a vibration isolating body formed with a rubber elastic member, a diaphragm formed with a rubber film is disposed on the upper side within the main body metal fitting facing the vibration isolating body, so that a liquid-enclosed chamber is formed with these constituting a part of a wall of the chamber, and the liquid-enclosed chamber is divided into two liquid chambers by a partition and both liquid chambers are communicated with each other by an orifice, wherein the lower mounting metal fitting comprises a boss metal fitting integrally formed with a mounting bolt projecting downward with a part thereof being inserted into the vibration isolating body, a tubular spacer metal fitting having a flange portion for a stopper at the upper portion and fitted into the boss metal fitting, and a mounting plate metal fitting integrally fixed to a part of the boss metal fitting by press fitting means so as to hold the spacer metal fitting between the mounting plate metal fitting and a step provided in the boss metal fitting, wherein the flange portion of the spacer metal fitting and the plate metal fitting provided a required clearance therebetween, and wherein the main body metal fitting is continuously provided with a cylindrical stabilizer with a lower end portion thereof being inwardly bent so as to be positioned within the clearance, thereby achieving a stopper action at a time of a large displacement of the main body metal fitting.

The liquid-enclosing type vibration isolating device is used by mounting and fixing the lower end mounting metal fitting on the support side such as the chassis and fastening the main body metal fitting to a bracket on the side of the vibration generating body such as the engine. Since the lower mounting metal fitting has such a structure that the spacer metal fitting and the mounting plate metal fitting are integrally fixed to the boss metal fitting inserted into the vibration isolating body, the spacer metal fitting and the plate metal fitting do not come off, thereby being easily mounted and fixed.

In this used state, since the vibration isolating body formed with a rubber elastic body is to be positioned lower than the liquid-enclosed chamber, thereby being kept away from the engine as a heat source, the vibration isolating body is prevented from deterioration due to the heat, so that the durability against heat is improved.

In the above used state, the main body metal fitting is vertically displaced owing to the elastic deformation of the vibration isolating body formed with a rubber elastic body which is caused by the vibration of the vibration generating body such as the supported engine. When the main body metal fitting is largely displaced downward, the lower end portion of the stabilizer continuously provided in the main body metal fitting is brought into contact with the mounting plate metal fitting, and when the main body metal fitting is largely displaced upward, the lower end portion of the stabilizer is brought into contact with the flange portion of the spacer metal fitting held in the boss metal fitting in a fixed state. Further, at a time of displacement in the directions perpendicular to the axis (backward and forward, and lateral directions), a side wall portion of the stabilizer is brought into contact with the flange portion of the spacer metal fitting. Accordingly, the all around stopper action is achieved, so that no stopper's deviation from its operationable position occurs to enhance the safety.

Accordingly, the device is of the all around stopper type have a good assembling and mounting operability, an excellent durability against heat and an excellent effect on maintaining the performances.

The spacer metal fitting has a flange portion for the stopper at the upper end portion, and is held in a fixed state by being held between the step provided in the boss metal fitting and the mounting plate metal fitting press fitted and fixed to the boss metal fitting. Accordingly, the spacer metal fitting is securely fixed to the boss metal fitting at a predetermined position and a predetermined clearance can be kept between the flange portion of the spacer metal fitting and the plate.

In the liquid-enclosing type vibration isolating device, it is preferable to structure such that a stopper rubber is attached to each of the lower surface of the flange portion in the spacer metal fitting and the upper surface of the plate metal fitting so that the lower end portion of the stabilizer is elastically brought into contact with the plate metal fitting. Accordingly, the elastic contact of the lower end portion of the stabilizer can reduce an impact at a time of contact as well as an impact sound.

Further, in the liquid-enclosing type vibration isolating device, the partition can be formed in a cup-like shape by drawing or spinning of a flat plate, with the upper and lower portions of the circumferential wall thereof being held between the periphery of the vibration isolating body, and with the periphery of the diaphragm in such a manner as to keep a sealed state with an orifice being formed between the outer peripheral wall portion and a side wall rubber layer which is integrally formed with the diaphragm and disposed along an inner periphery of the main body metal fitting.

Accordingly, manufacturing and assembling of the device become further easier, and further, a good vibration-isolating performance can be exhibited.

BRIEF DESCRIPTION OF THE DRAWINGS

FIG. 3 is a cross sectional view which shows a state under assembly.

DETAILED DESCRIPTION OF THE PREFERRED EMBODIMENT

Figure 1:
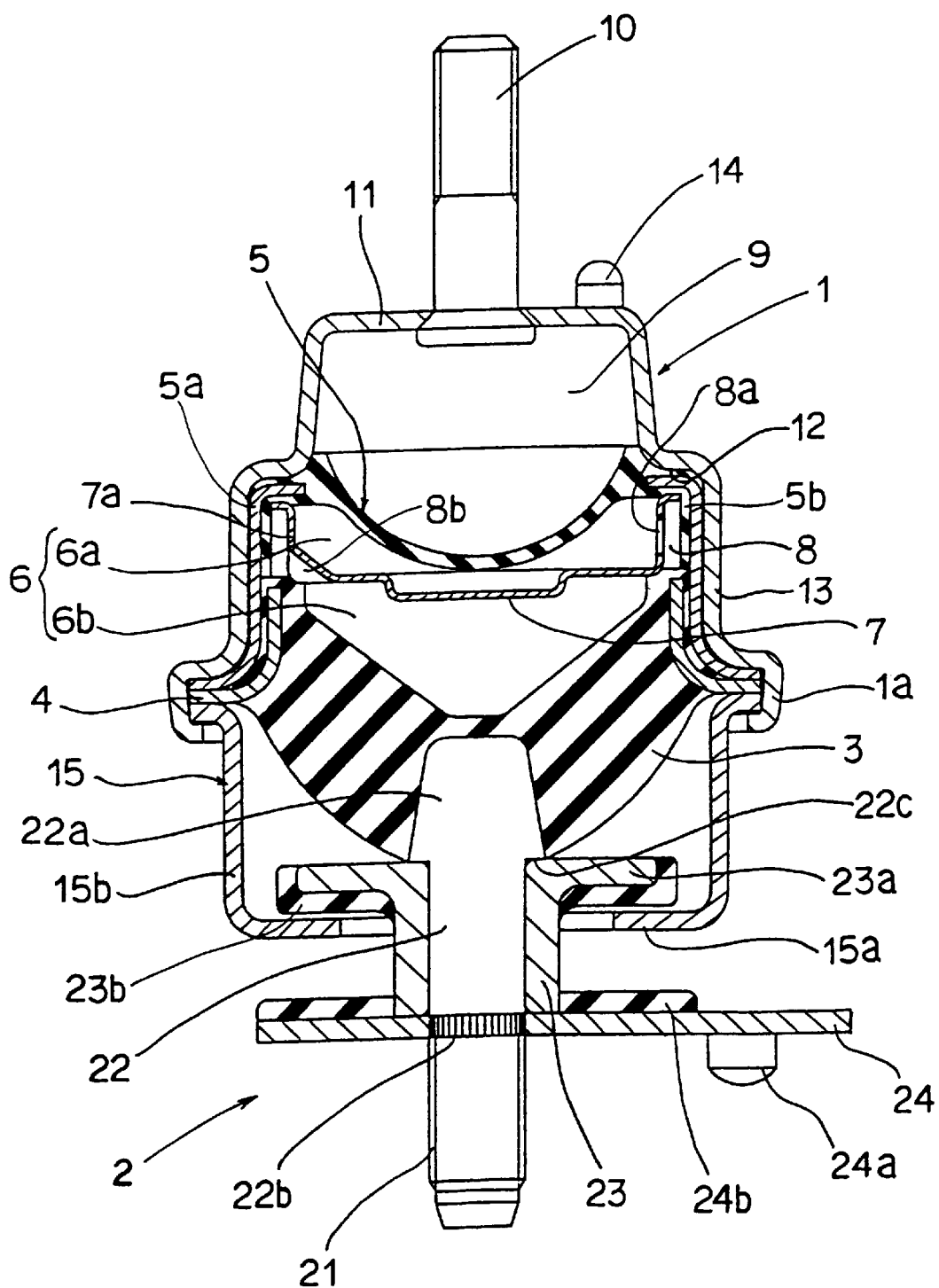
FIG. 1 is a vertical cross sectional view which shows a liquid-enclosing type vibration isolating device in accordance with an embodiment of the invention.
Figure 2:
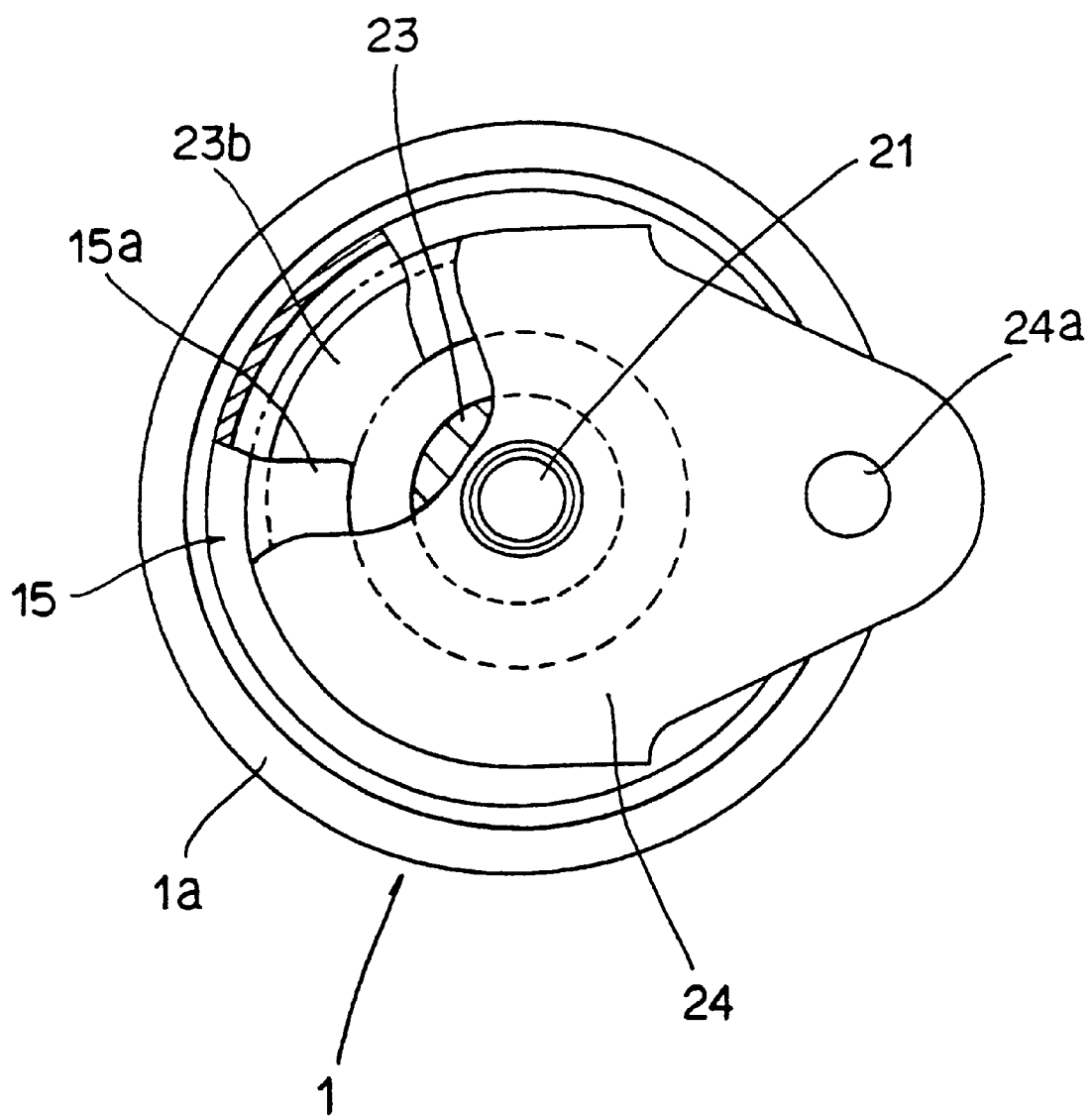
FIG. 2 is a bottom view in which a part of the same is cut away.

Next, an embodiment in accordance with the invention will be described below with reference to the attached drawings. However, the invention is not limited to this.

In the drawing, reference numeral 1 denotes an upper main body metal fitting formed in an inverted cup-like shape with a cylindrical barrel portion opened downward and reference numeral 2 denotes a lower mounting metal fitting. Reference numeral 3 denotes a thick vibration isolating body formed with a rubber elastic body disposed between both the metal fittings. A part of the mounting metal fitting 2 is inserted and fixed to the vibration isolating body 3 at the axial center portion thereof by vulcanizing press means. A reinforcing metal fitting 4 is fixed to an outer periphery of an upper end of the vibration isolating body 3 while a part of the reinforcing metal fitting 4 is inserted by the vulcanizing press means. A part in which the reinforcing metal fitting 4 is inserted to the vibration isolating body 3 is fitted to the main body metal fitting 1 to form a sealed state. An outer peripheral edge of the reinforcing metal fitting 4 is fixed to the main body metal fitting 1 by means of caulking of the outer peripheral edge. In this way, the body metal fitting 1 and the lower mounting metal fitting 2 are connected to each other through the vibration isolating body 3.

In an upper-portion side within the main body metal fitting 1, a diaphragm 5 formed with a rubber film is disposed in such a manner as to face the vibration isolating body 3, and a liquid-enclosed chamber 6 is formed below the diaphragm 5. The diaphragm 5 and the vibration isolating body 3 constitute a part of the chamber wall. The liquid-enclosed chamber 6 is divided into two, upper and lower liquid chambers 6a and 6b, by a partition 7 fitted to an inner periphery of the main body metal fitting 1. The upper and lower liquid chambers 6a and 6b are communicated with each other by an orifice 8 formed on the circumference of the partition 7. Reference numerals 8a and 8b denote communication portions from the orifice 8 to both the liquid chambers 6a and 6b. Reference numeral 9 denotes an air chamber formed above the upper surface of the diaphragm.

The main body metal fitting 1 has an upper surface portion 11, a cylindrical barrel portion 13 extending downward through a step portion 12 continuously provided from an upper surface portion 11, and a mounting bolt 10 projectingly provided in the upper surface portion 11 so as to be fastened to a bracket related to a vibration generating body such as an automotive engine. Reference numeral 14 denotes a pin for positioning the device at a time of its mounting.

A cylindrical stabilizer 15 extending downward along an outer side in such a manner as to cover whole circumference of the vibration isolating body 3 is continuously and integrally fixed to a caulked portion of the end portion 1a in the body metal fitting 1, and a lower end portion 15a of the stabilizer 15 is bent and extended inward so as to form an inside flange shape, and is formed as a contact portion for a stopper described below.

The lower mounting metal fitting 2 comprises a boss metal fitting 22, which is integrally formed with a mounting bolt 21 projecting downward and has an upper portion 22a inserted in the axial center portion of the vibration isolating body 3 by the vulcanizing press means, a spacer metal fitting 23 for keeping a clearance, which is formed in a tubular shape having a stopper-forming flange 23a at an upper portion of the tubular shape (in the drawing, at an upper end) and fitted to the boss metal fitting 22, and a plate metal fitting 24 for mounting, which is press fitted into a knurled portion 22b for serration formed in a part of the boss metal fitting 22 so as to be integrally fixed to the knurled portion 22b. Accordingly, by press fitting and fixing the plate metal fitting 24 to the boss metal fitting 22, the spacer metal fitting 23 is securely held between the plate metal fitting 24 and a step 22c in the boss metal fitting 22, whereby the lower mounting metal fitting 2 is integrally assembled such that a predetermined clearance is kept between the flange portion 23a and the plate metal fitting 24. The clearance between the flange portion 23a and the plate metal fitting 24 can be adjusted by changing a length of the spacer metal fitting 23. Reference numeral 24a denotes a pin provided in the plate metal fitting 24 in such a manner as to project downward for positioning the device at a time of its mounting.

Further, the lower end portion 15a of the stabilizer 15 continuously provided in the main body metal fitting 1 and formed in an inward flange shape is disposed between the flange portion 23a of the mounting metal fitting 2 and the plate metal fitting 24 in such a manner as to provide a predetermined clearance, so that the lower end portion 15a can be brought entirely into contact with the flange portion 23a or the plate metal fitting 24 when the main body metal fitting 1 is largely displaced up and down, and a side wall portion 15b of the stabilizer 15 is brought into contact with an outer periphery of the flange portion 23a at a time of a large displacement in the directions perpendicular to the axis (backward and forward, and lateral directions in relation to the vehicle).

Stopper rubbers 23b and 24b are respectively attached to an area ranging from the lower surface of the stopper-forming flange portion 23a to the outer peripheral surface of the flange portion 23a, and the upper surface of the plate metal fitting 24 by the vulcanizing and bonding means. The lower end portion 15a of the stabilizer 15 is elastically brought into contact therewith, so that an impact at the stopper action can be reduced.

Further, each of the clearance between the inward-flange-shaped lower end portion 15a of the stabilizer 15 and the lower surface of the flange portion 23a (the lower surface of the stopper rubber), and between that lower end portion 15a and the upper surface of the plate metal fitting 24 (the upper surface of the stopper rubber) is set so as to ensure a predetermined value in accordance with an elastic force of the vibration isolating body 3 in a state that a load such as that of the engine is applied.

In the device in accordance with the illustrated embodiment, the diaphragm 5 is reinforced by a cylindrical reinforcing metal fitting 5a disposed around an outer peripheral portion of the diaphragm 5 and bonded thereto by the vulcanizing and bonding means. In addition, the reinforcing metal fitting 5a is fitted to the cylindrical barrel portion 13 of the body metal fitting 1 and is integrally fixed in the caulked portion of the end portion 1a, and the vibration isolating body 3 is fitted and fixed to the main body metal fitting 1 through the reinforcing metal fitting 5a. Reference numeral 5b denotes a side wall rubber layer on an inner periphery of the reinforcing metal fitting 5a.

The partition 7 dividing the liquid-enclosed chamber 6 into two chambers is formed in a cup-like shape by drawing or spinning processing of a flat plate, and circumferential wall 7a of the partition 7 are held, from above and below, between the periphery of the vibration isolating body 3 and the periphery of the diaphragm 5 in such a manner as to keep a sealed state. A portion between the circumferential wall 7a and the side wall rubber layer 5b is formed as the orifice 8 communicating both the upper and lower liquid chambers 6a and 6b by the communication portions 8a or 8b which is formed as a cutout hole or a dent. When the structure is made in the above manner, the partition 7 can be easily processed and the orifice 8 can be simply formed, so that the device can be provided with a reduced manufacturing cost, a light weight and an ensured good characteristic as a two-chambered, liquid-enclosing type vibration isolating device.

To assemble the liquid-enclosing type vibration isolating device having the above structure, for example, in a state in which the device is turned upside down as shown in FIG. 3, at first, the diaphragm 5, the partition 7 and the vibration isolating body 3 having the inserted boss metal fitting 22 are successively fitted to the main body metal fitting 1. Next, the spacer metal fitting 23 is fitted to the boss metal fitting 22, and the cylindrical stabilizer 15 is put thereon in such a manner as to engage the inward-flange-shaped lower end portion 15a with the flange portion 23a so as to be attached in a non-fixed state. Thereafter, the plate metal fitting 24 is press fitted to the knurled portion 22b of the boss metal fitting 22 so as to be fixed thereto. Then, onto the end portion 1a of the main body metal fitting 1, the periphery of the reinforcing metal fitting 5a of the diaphragm 5, the periphery of the reinforcing metal fitting 4 of the vibration isolating body 3 and the periphery of the stabilizer 15 can be integrally caulked and fixedly connected. Further, the same caulking as described above can be carried out by fitting the vibration isolating body 3 to the main body metal fitting 1 with the spacer metal fitting 23 and the plate metal fitting 24 being assembled together with the stabilizer 15 and mounted on the boss metal fitting 22 a part of which is inserted to the vibration isolating body 3.

The liquid-enclosing type vibration isolating device described above is used by mounting and fixing the lower mounting metal fitting 2 on the support side such as the chassis by means of the mounting plate metal fitting 24 and the mounting bolt 21, and by fastening the main body metal fitting 1 to the bracket on the side of the vibration generating body such as the engine. Since the spacer metal fitting 23 is integrally fixed by being held between the boss metal fitting 22 and the plate metal fitting 24 press fitted thereto, there is no risk of their coming off, whereby they are easily mounted and fixed.

When the device is used in this mounted state, the vibration isolating body 3 formed with a rubber elastic body is to be positioned lower than the liquid-enclosed chamber 6 and is kept away from the engine as a heat source, so that the vibration isolating body 3 is prevented from deteriorating due to the heat and the heat resistance is improved.

Further, in this used state, the main body metal fitting 1 will be vertically displaced owing to the elastic deformation of the vibration isolating body 3 caused by the vibration of the vibration generating body such as the supported engine. When the main body metal fitting 1 is largely displaced downward, the inward-flange-shaped lower end portion 15a of the stabilizer 15 continuously provided in the main body metal fitting 1 is brought into contact with the mounting plate metal fitting 24 and, when the main body metal fitting 1 is largely displaced upward, the lower end portion 15a of the stabilizer 15 is brought into contact with the flange portion 23a of the spacer metal fitting 23 which is fitted to the boss metal fitting 22 so as to be held in a fixed state. Further, at a time of displacement in the directions perpendicular to the axis (backward and forward, and lateral directions), the side wall portion 15b of the stabilizer 15 is brought into contact with the flange portion 23a. In this way, the all around stopper action can be achieved, and no stopper's deviation from its operationable position occurs so as to improve the reliability.

What is claimed is:

1. A liquid-enclosing type vibration isolating device in which a main body metal fitting opened downward and a mounting metal fitting disposed thereunder are connected to each other through a vibration isolating body formed with a rubber elastic member, a diaphragm formed with a rubber film and facing said vibration isolating body is disposed on an upper-portion side within the main body metal fitting, so that a liquid-enclosed chamber is formed with these constituting a part of a wall of the chamber, and the liquid-enclosed chamber is divided into two liquid chambers by a partition and both liquid chambers are communicated with each other by an orifice, wherein the lower mounting metal fitting comprises a boss metal fitting integrally formed with a mounting bolt projecting downward with a part of the boss metal fitting being inserted into the vibration isolating body, a tubular spacer metal fitting having a flange portion for a stopper at its upper portion and fitted into said boss metal fitting, and a mounting plate metal fitting integrally fixed to apart of said boss metal fitting by press fitting means so as to hold said spacer metal fitting between the mounting plate metal fitting and a step provided in the boss metal fitting, and wherein the flange portion of said spacer metal fitting and said plate metal fitting provided a required clearance therebetween, and the main body metal fitting is continuously provided with a cylindrical stabilizer with a lower end portion thereof being inwardly bent so as to be positioned within said clearance, thereby achieving a stopper action at a time of a large displacement of the main body metal fitting.

2. A liquid-enclosing type vibration isolating device according to claim 1, wherein said spacer metal fitting has a flange portion for a stopper at its upper end portion, and is held in a fixed state by being held between the step provided in the boss metal fitting and said mounting plate metal fitting press fitted and fixed to the boss metal fitting.

3. A liquid-enclosing type vibration isolating device according to claim 1, wherein a stopper rubber is attached to each of a lower surface of the flange portion of said spacer metal fitting and an upper surface of said plate metal fitting so that the lower end portion of said stabilizer is elastically brought into contact with said plate metal fitting.

4. A liquid-enclosing type vibration isolating device according to claim 1, wherein said partition is formed in a cup-like shape by drawing or spinning processing onto a flat plate, and a circumferential wall of the partition are held, from above and below, between a periphery of the vibration isolating body and a periphery of the diaphragm in such a manner as to keep a sealed state while an orifice is formed between said circumferential wall and a side wall rubber layer which is integrally formed with the diaphragm and disposed along an inner periphery of the main body metal fitting.

* * * * *